J. M. BOORMAN.
Hay Raker and Loader.

No. 77,247.

Patented April 28, 1868.

Witnesses
JW Coombs
A Leclerc

Inventor
J. Marcus Boorman

United States Patent Office.

J. MARCUS BOORMAN, OF SCARBOROUGH, NEW YORK.

Letters Patent No. 77,247, dated April 28, 1868.

---

IMPROVEMENT IN HAY-RAKERS AND LOADERS.

---

The Schedule referred to in these Letters Patent and making part of the same.

---

TO ALL WHOM IT MAY CONCERN:

Be it known that I, J. MARCUS BOORMAN, of Scarborough, in the county of Westchester, and State of New York, have invented certain new and useful Improvements in Hay-Loading Machines; and I do hereby declare that the following is a full, clear, and exact description of the same, reference being had to the accompanying drawings, making a portion of this specification, in which—

Similar letters of reference indicate corresponding parts in all the figures.

The object of this invention is to provide a more than ordinarily efficient apparatus for gathering hay from the ground and depositing it upon the vehicle employed to convey it to the barn, stack, or other place of deposit or storage.

The invention consists in so pivoting the apparatus to the vehicle that it may be tilted in such manner that its driving-pinions may be very readily brought out of gear with the driving-gears on the wheels of the vehicle, thereby enabling the motion of the apparatus to be conveniently stopped without necessitating its detachment from the vehicle.

The invention further consists in certain novel means, whereby the easy attachment of the forks to the carrier-belts, and their retention upon the same, are provided for, and in certain means whereby the upright frame or series of slats hereinbefore mentioned may be very readily removed when it is desired to use the rest of the apparatus as a hay-tedder.

To enable others to understand the construction and operation of my invention, I will proceed to describe it with reference to the drawings.

The vehicle or wagon which the apparatus is employed to load, may be of any suitable kind, and has secured upon one side of each of its rearmost wheels $a$, a toothed rim or spur-wheel, $b$, the purpose of which will hereinafter appear. Shown at $c$ is the rear portion of a horizontal framework or rigging placed upon the box $d$ of the vehicle, and of any appropriate construction.

Figure 1:
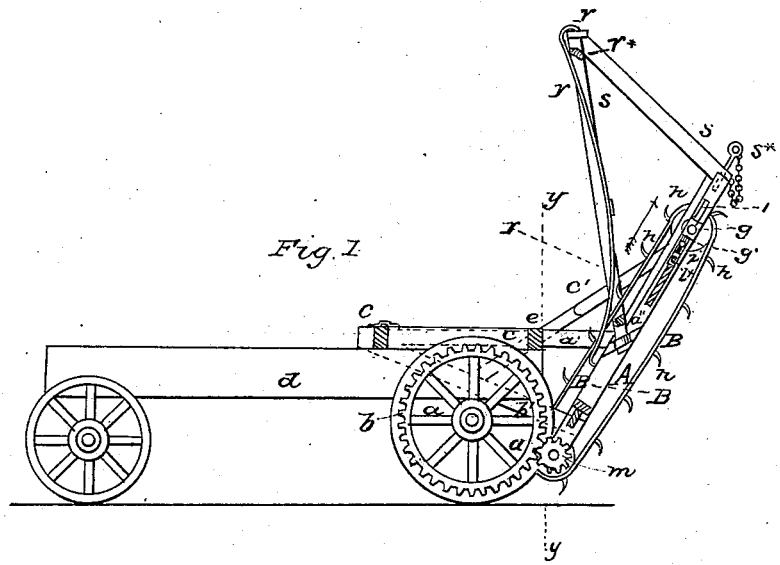
Figure 1 is a vertical longitudinal section of a hay-loading machine made according to my invention, taken in the line $x\,x$ of fig. 2.
Figure 2:
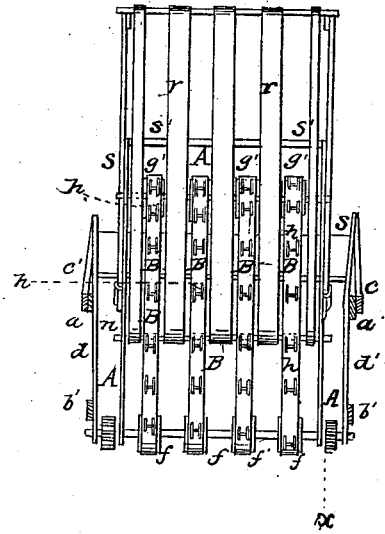
Figure 2 is a front vertical transverse section, taken in the line $y\,y$ of fig. 1.
Figure 3:
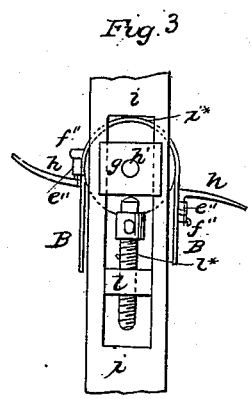
Figure 3 is a detached view of one portion of the invention.

Situated behind the vehicle, in the backwardly-inclined position indicated in fig. 1, is a rectangular frame, A, provided at each side with a forwardly-extending supporting framework, which may consist of four bars, marked respectively $a'\,b'\,c'\,d'$, arranged and secured together as shown in figs. 1 and 2. These supporting frameworks $a'\,b'\,c'\,d'$ are pivoted to the rear end of the rigging $c$, as shown at $e$, in such manner that, by forcing downward the forward ends of the aforesaid frameworks, the lower end of the frame A may be swung back, as will be hereinafter fully set forth. Provided, one in the upper and the other in the lower end of the frame A, are two transverse shafts $f\,g$, each of which is furnished with a number of pulleys, indicated respectively at $f'$ and $g'$. The pulleys on one of the said shafts are opposite to or in line with those on the other; and extending over and from each of the pulleys $f'$, opposite to the pulley $g'$, thereto, is an endless belt or apron, B, which is furnished at suitable distances apart with forks $h$, the construction and method of attachment to the belts B of which will be hereinafter fully set forth.

In order that the belts B may be maintained at the requisite tension or tightness upon their pulleys $f'\,g'$, each of the bearings $h'$, in which the ends of the upper shaft $g$ are situated, is placed in a longitudinal guide or slot, $i^*$, provided in one of the side-pieces $i$ of the frame A, and is capable of being moved up and down therein. Provided in the lower part of the said slot is a fixed nut, $l$, through which works a screw, $l^*$, turned by a suitable rod or lever inserted in a transverse eye, $l'$, formed therein. By turning the screws $l^*$, the bearings $h'$ of the two ends of the shaft $g$ may be forced upwards until the belts B are drawn sufficiently tight upon their pulleys $f'$ $g'$, to insure their movement by the rotation of the pulleys $f'$ in the operation of the machine.

The lower shaft $f$ is furnished at its two extremities with two spur-pinions $m$, which, when the machine is in operation, gear into the toothed rims $b$ on the rearmost wheels of the vehicle, the pinions being retained in contact with the aforesaid rims by the leverage exerted thereon by the backwardly-inclined position of the frame A.

Extending from one side of the frame A to the other, and through the spaces within the endless belts B, is a transverse rod or bar, $n$, which is situated at a height nearly or quite corresponding to that of the rigging $c$. From this bar $n$ there extends upwards, in a forwardly-inclined position, as shown in fig. 1, a series of slats, $r$, the upper ends of which are attached to a cross-piece, $r'$, which connects the upper ends $r^*$ of two triangular side-frames $s$, the rear corners of which are connected by a cross-piece, $s'$, which rests upon the upper ends of the side-pieces $i$, of the frame A, and is fixed thereto by pins $s^*$, passing down through the said cross-piece into suitable holes provided in the tops of the side-pieces just mentioned. The lower ends of the side-frames $s$ are fitted into straps or sockets $a''$ provided upon the side-pieces $i$. When it is desired to remove the series of slats $r$, it is only necessary to withdraw the rod $n$ and pins $s^*$, whereupon the said slats, together with the triangular side-frames $s$, which support the same, may be lifted from the frame A.

As the vehicle is drawn along, the toothed rims $b$, acting through the pinions $m$ and pulleys $f'$, move or turn the endless belts B in the direction indicated by the arrow in fig. 1, whereupon the forks, passing close to the ground, grasp or lift the hay therefrom, and carry it upward past the rear end of the vehicle, after which the hay passes in front of the slats $r$. As the forks move upward, the said slats, being inclined forward with reference to the path of the forks gradually push the hay from the latter, the momentum of the forks being sufficient to throw the hay upward sufficiently to insure its falling upon the rigging, upon which it is arranged in suitable position by the attendant.

Figure 4:
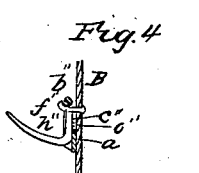
Figure 4 is a sectional view of another portion thereof.
Figure 5:
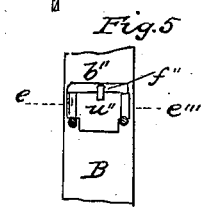
Figure 5 is a front transverse section of the portion shown in fig. 4.
Figure 6:
Figure 6 is a transverse section of the same, taken at right angles to fig. 5.

The forks $h$ are each made of a single piece of steel, or other suitable metal bent to form two tines, united by a cross-piece, $b''$, the said tines being formed with a straight portion, $c''$, adjacent to the cross-piece $b''$, and situated at an acute angle to a line drawn from the outer end of such part $c''$ to the extremity of the tine, as represented in fig. 4. Each of the forks is attached to the endless belt carrying the same, as follows:

A plate, $u$, is riveted fast upon the belt, and has its two lateral edges turned over, as indicated more fully in fig. 6, so as to form two lips or flanges $e''$, underneath which are thrust the portions $c''$ of the tines of the forks, and in front of the cross-piece $b''$ of the fork are placed one or more rivets or stiff pins or studs $f''$, which prevent the fork from slipping forward, and thus serve to retain the inner portions $c''$ of the fork under the lips or flanges $e''$, which hold the forks against the strain exerted thereon by the weight of the hay when the latter is lifted, as hereinbefore explained. By this means the forks may be very securely and very easily attached to the belts, at the same time that they may, if desired, be very readily detached therefrom by simply cutting off the rivet or rivets $f^*$. When it is desired to stop the motion of the working parts of the apparatus, without detaching the same from the vehicle, it is only necessary to depress the forward ends of the supporting frameworks $a'$ $b'$ $c'$ $d'$, as hereinbefore explained, in order to bring the driving-pinions $m$ away from the toothed rims $b$ on the wheels $a$, thus securing the desired result.

When it is desired to employ the apparatus as a hay-tedder, the slats $r$, with their side-frames $s$, are removed, whereupon the hay, when lifted, will be thrown back over the upper ends of the carrier-belts, and, being thus shaken and separated, will be lightly deposited upon the ground.

What I claim as my invention, and desire to secure by Letters Patent, is—

1. So pivoting the apparatus to the vehicle that it may be tilted to bring the driving-pinions $m$ out of gear with the toothed rims or spur-wheels $b$ on the rear wheels of the vehicle, substantially as and for the purpose specified.

2. The attachment of the forks $h$ to the endless belt by means of the plates $u$ furnished with lips $e''$, and the studs or rivets $f''$, substantially as and for the purpose specified.

3. The transverse rod $n$ and pins $s^*$, in combination with the series of slats $r$, their side-frames $s$ and the frame A, supporting the carrier-belts B, whereby the slats $r$, with their side-frames, may be readily detached, substantially as and for the purpose specified.

J. MARCUS BOORMAN.

Witnesses:
   J. W. COOMBS,
   A. LE CLERC.